United States Patent
Meinl

(10) Patent No.: US 11,422,806 B2
(45) Date of Patent: Aug. 23, 2022

(54) PARALLELIZED PROCESSING OF ELEMENTS OF A FIRST VECTOR AND A SECOND VECTOR USING CYCLICAL TRANSMISSION OF VECTOR ELEMENTS BETWEEN PROCESSORS

(71) Applicant: Robert Bosch GmbH, Stuttgart (DE)

(72) Inventor: Frank Meinl, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 312 days.

(21) Appl. No.: 15/975,406

(22) Filed: May 9, 2018

(65) Prior Publication Data
US 2018/0329709 A1 Nov. 15, 2018

(30) Foreign Application Priority Data
May 10, 2017 (DE) .......................... 102017207876.6

(51) Int. Cl.
*G06F 9/30* (2018.01)
*G06F 15/80* (2006.01)
*G06F 9/38* (2018.01)

(52) U.S. Cl.
CPC ........ *G06F 9/30036* (2013.01); *G06F 9/3887* (2013.01); *G06F 15/8046* (2013.01)

(58) Field of Classification Search
CPC .......................... G06F 9/30036; G06F 15/8046
See application file for complete search history.

(56) References Cited

U.S. PATENT DOCUMENTS

| | | | | |
|---|---|---|---|---|
| 6,304,670 B1* | 10/2001 | Berestov | .................. | G09G 5/02 382/162 |
| 7,831,804 B2* | 11/2010 | Pappalardo | ........... | G06F 1/3203 712/20 |
| 2011/0040561 A1* | 2/2011 | Vair | ........................ | G10L 17/04 704/240 |
| 2015/0074380 A1* | 3/2015 | Huang | ................... | G06F 9/3877 712/215 |
| 2016/0055031 A1* | 2/2016 | Tu | ........................... | G06F 9/441 713/2 |
| 2017/0248686 A1* | 8/2017 | Zivkovic | ................. | G01S 13/42 |

FOREIGN PATENT DOCUMENTS

DE          19937723 C2     10/2001

\* cited by examiner

*Primary Examiner* — Keith E Vicary
(74) *Attorney, Agent, or Firm* — Norton Rose Fulbright US LLP; Gerard Messina

(57) ABSTRACT

A method for parallelized processing of elements of a first vector R using processors 1 through k includes steps of a) loading a first non-loaded element of the first vector R into processor 1; (b) loading the next non-loaded element of the first vector R in processor 1; (c) parallel processing of loaded elements by the processors; (d) transmitting the loaded elements of the first vector R from processors 1 through k−1 to the respectively next processor 2 through k; (e) loading the next non-loaded element of the first vector R in processor 1; and (f) returning to step c if not all elements of the first vector R were loaded and processed.

9 Claims, 2 Drawing Sheets

PARALLELIZED PROCESSING OF ELEMENTS OF A FIRST VECTOR AND A SECOND VECTOR USING CYCLICAL TRANSMISSION OF VECTOR ELEMENTS BETWEEN PROCESSORS

CROSS-REFERENCE TO RELATED APPLICATIONS

The present application claims priority under 35 U.S.C. § 119 to DE 10 2017 207 876.6, filed in the Federal Republic of Germany on May 10, 2017, the content of which is hereby incorporated by reference herein in its entirety.

FIELD OF THE INVENTION

The present invention relates to parallelized processing. The present invention relates in particular to processing vector elements using multiple processors.

BACKGROUND

Certain problems of physical measuring and processing technology lend themselves to being parallelized, multiple processors working concurrently on the solution of a common problem. In one specific embodiment, all processors are operated using the same instructions, but different data (SIMD: single instruction multiple data).

Parallelized processing can be performed, for example, in connection with the evaluation of radar signals that were reflected on an object. A particularly relevant example is shown in DE 199 37 723 C2. In this example, an elevation angle error of a multi-beam radar sensor is to be determined.

A known problem in the processing of radar signals is the estimation of a directional angle of an object. A radar signal is emitted, is reflected by the object, and is received again. If two objects are superimposed, it is possible to perform a two-dimensional search across a series of received measurement data. The measurement data exist in the form of a vector, the task being to process different elements of the vector having different indices with one another.

These and other technical problems, in particular in the area of digital signal processing, can be parallelized in that multiple processors are loaded respectively with different elements of one or multiple vectors and determine from these a combinational value.

An objective at the basis of the present invention is to indicate an improved technique for the parallelized processing of elements of a vector.

SUMMARY

A method for the parallelized processing of elements of a first vector R using processors 1 through k includes steps of (b) loading the next non-loaded element of first vector R in processor 1; (c) parallel processing of loaded elements by the processors; (d) transmitting the loaded elements of the first vector R from processors 1 through k−1 to the respectively next processor 2 through k; (e) loading the next non-loaded element of first vector R in processor 1; and (f) returning to step c if not all elements of first vector R were loaded and processed.

The cyclical transmission of an element of first vector R, once it has been loaded, makes it possible to prevent the same value from having to be transferred frequently from a memory into one of the processors. In particular, if the first vector R is large, it can require only few memory accesses in order to process all elements of the vector in parallelized fashion using multiple processors.

It is particularly preferred that the method is designed for parallelized processing of elements of a first vector R and a second vector L using processors 1 through k. Prior to the above-mentioned steps b through f, it is possible to perform a step a, in which k elements of second vector L are loaded into processors 1 through k. Following the above-mentioned step f, the next k elements of second vector L are then loaded into processors 1 through k in a step g, and the method returns in a step h to step c if not all elements of second vector L were loaded and processed.

This makes it possible to form combinations between elements of two vectors R and L and to process these in parallelized fashion using the processors. The described method lends itself particularly if both vectors have the same length. Furthermore, the method can be used when the processing is limited to elements whose indices in vectors R and L differ from one another. If combinations of the elements of vectors R and L are entered into a matrix, the combinations of the elements that are of interest form an upper or lower triangular matrix. If the resulting matrix is symmetrical or Hermitian, then it suffices to evaluate only one of the two triangular matrices.

It is furthermore preferred that the above-mentioned steps a through h are performed alternately in an ascending and in a descending order. In an ascending run-through, indices of elements of first vector R are ascending, a processor having a low index being assigned an element of second vector L having a high index, and a processor having a high index being assigned an element of second vector L having a low index. In a descending run-through, indices of elements of first vector R are descending, a processor having a low index being assigned an element of second vector L having a low index, and a processor having a high index being assigned an element of second vector L having a high index.

In the ascending variant, indices of the elements of first vector R are incremented and the loaded elements of first vector R are relayed in the direction of ascending indices of the processors. A processor having a low index is assigned an element of second vector L having a high index, and a processor having a high index is assigned an element of second vector L having a low index.

In the descending variant, the indices of the elements of first vector R are decremented and the elements of first vector R are relayed in the direction of ascending indices of the processors as in the first variant. A processor having a low index is assigned an element of second vector L having a low index, and a processor having a high index is assigned an element of second vector L having a high index.

The processors can be successively transitioned from the first into the second variant or vice versa. In other words, a processor, which toward the end of a run-through of steps c through f can no longer be engaged because all elements were already loaded and processed in the run-through direction of first vector R, can be used for loading and/or processing values with respect to another element of the second vector. For a complete run-through of the method, in which all combinations are formed between elements of vectors R and L, in which the indices of the elements of vectors R and L differ from one another, it is possible to achieve a complete capacity utilization of all processors during the entire run time of the method. This makes it possible to maximize the efficiency of a corresponding evaluation system. The method can be used for example to process radar signals, as was already mentioned above. The evaluation can be accelerated, which makes it possible to achieve an increased evaluation speed or evaluation frequency.

In an example embodiment, the two vectors R and L are identical so that the elements of vector L are already available by loading vector R in the processor. These can be stored at the right time in a register or a dedicated intermediate memory (e.g., register, cache, etc.) in the processor. As a result, it is not necessary to load the next k elements of vector L anew, and steps a and g, respectively, can be skipped.

In an example embodiment, the vectors span a matrix whose elements are filled with results of the processings in step c. The described procedure is also able to optimize write access to a memory in which the matrix is stored.

It is furthermore preferred that the processing comprises a maximum likelihood analysis of elements of the vectors. It is furthermore preferred that elements of the vectors respectively relate to a directional angle of a scanned radar signal. By way of the maximum likelihood analysis, it is possible to ascertain in an improved manner for example directional angles of two mutually superimposing objects in a search space two-dimensionally spanned by vector R. The resulting matrix can be symmetrical, i.e., it is possible preferably to evaluate only the lower or only the upper triangular matrix.

According to an example embodiment, a computer program product includes program code for carrying out the method described above when the computer program product is run on a processing device or is stored on a computer-readable data carrier. The processing device can include in particular one or multiple of the above-mentioned processors. A processor can be designed for example as a programmable microcomputer or microcontroller, as an application specific integrated circuit (ASIC) or as a field-programmable gate array (FPGA).

According to an example embodiment, a processor for implementing the above-described method includes a processing device for processing one or multiple elements of a vector; a first memory element designed to be loaded with an element of the vector; a second memory element for accepting the element of the first memory element, while the first memory element is loaded anew; a third memory element for providing an element of a vector of another processing device, a first interface for accepting an element; a second interface for providing an element; and a third interface for providing a result.

The processor can be designed in particular to be concatenated with another processor in order to improve the transmission of a variable or of an element of a vector. The processor is not necessary in order to implement the method described above, but is able to support it efficiently. Features or advantages of the processor can be referred to the method and vice versa.

According to an example embodiment, a processor system includes several of the described processors, the processors being concatenated in series. Following in particular the SIMD principle, the processors are able to process different data in the same manner using the same instructions. The concatenation can be implemented by suitable interfaces. A concatenation connection preferably only exists between the interfaces of concatenated processors so that only little physical expenditure is required. Since the concatenations do not have to transmit other signals, it is possible to achieve a high transmission speed and transmission security.

DETAILED DESCRIPTION

Figure 1:
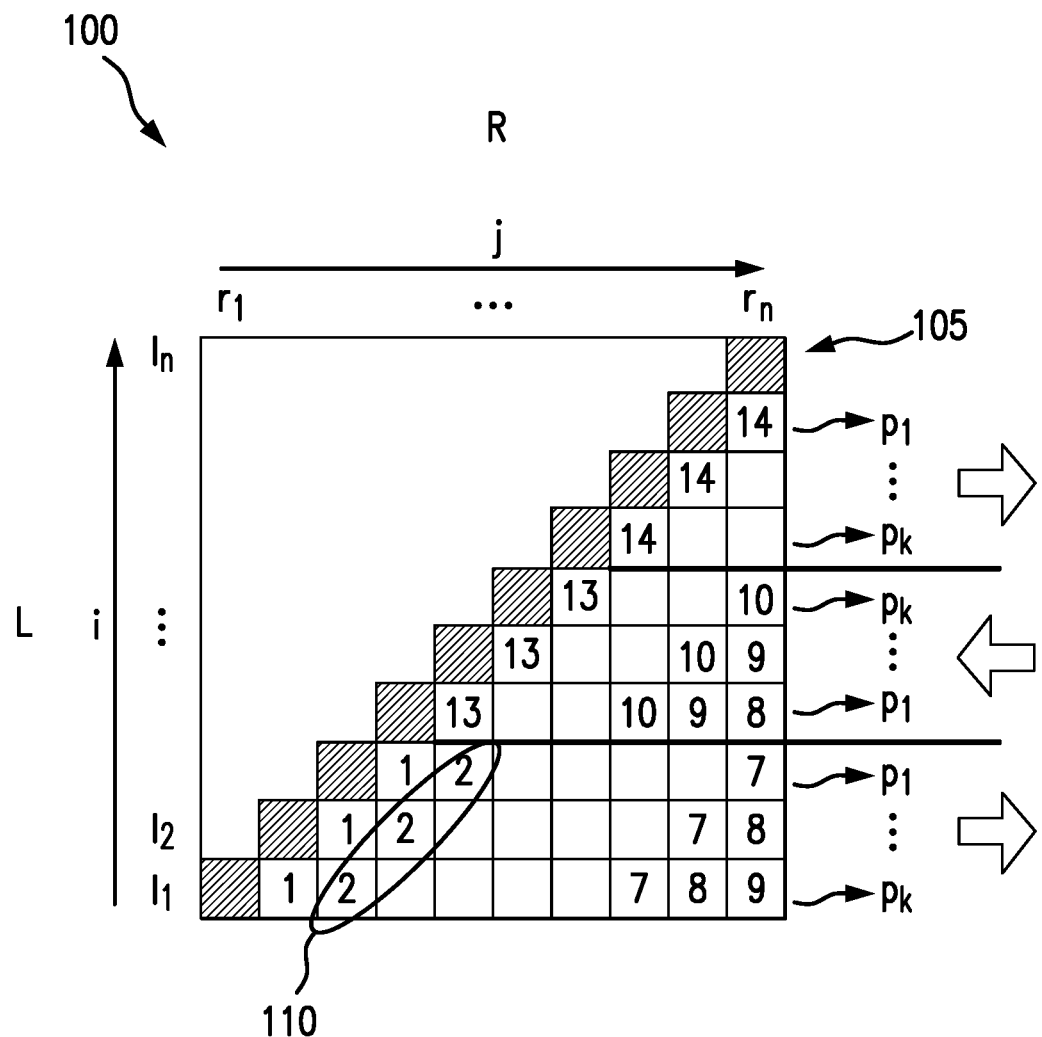
FIG. 1 illustrates a method according to an example embodiment of the present invention.

FIG. 1 shows an illustration of a method 100. A first vector R including elements $r_1$ through $r_n$ as well as a second vector L including elements $l_1$ through $l_n$ are given. Combinations are to be formed between elements of vectors L and R, only those combinations being of interest, in which the indices of the elements in their respective vectors R and L differ from one another.

In an illustrative example, an estimation of angles of arrival θ of two objects partially superimposing one another from the perspective of a measuring radar system can be performed using a deterministic maximum likelihood method (DML). For this purpose, a two-dimensional search is to be performed about the angle of arrival of the first object and the angle of arrival of the second object. The following equation is to be evaluated for any possible combination of i and j in order to find the maximum and thus the two most probable angles of arrival;

$$\operatorname*{argmax}_{\theta_i, \theta_j} \frac{|r_i|^2 + |r_j|^2 - 2\operatorname{Re}[r_i r_j * \beta_{ij}]}{1 - |\beta_{ij}|^2}$$

An important optimization in this calculation makes use of the symmetry of the two-dimensional data structure so that only an upper or only a lower triangular matrix needs to be evaluated. Upon closer examination, one recognizes that the two-dimensional calculation is based inter alia on the values $r_i$ and $r_j$ of a vector R, which are to be loaded into the processor for this purpose. Here it is possible to make use of the fact that it is possible to use the value $r_i$, once it is loaded, for calculating multiple cells of the matrix.

FIG. 1 represents a matrix 105 in which all possible combinations of elements of two vectors R and L are formed as respectively one matrix element. In the case of the DML method for 2 objects, vectors R and L would be identical, but the described method is represented in the following in exemplary fashion for two different vectors.

First vector R is plotted in the horizontal direction, and its continuous index is j; second vector L is plotted in the vertical direction, and its continuous index is i. In the chosen representation, an arbitrary element of matrix 105 has a rightward value of j and an upward value of i. Matrix elements that have the same indices for the element of first vector R and of second vector L are colored black. The series of black matrix elements divides matrix 105 into two triangular matrices, which respectively include all combinations of elements of vectors R and L that are of interest. Only the lower triangular matrix is shown by way of example.

Furthermore, k processors are given, which are here indicated by $p_1$ to $p_k$. For the parallelized processing of combinations of the elements of vectors R and L, respectively one processor p is assigned, by way of example, to a row of matrix 105 and thus to a value $l_i$ of second vector L. Thus, first processor $p_1$ initially works successively on combinations of the $k^{th}$ element $l_k$ of second vector L with elements $r_{k+1}$ through $r_n$ of first vector R. The present invention provides for processors $p_1$ through $p_k$ to work in a temporally offset manner on elements of first vector R. This makes it possible to minimize the number of accesses to vectors R and L or their elements. If vectors L and R are stored in a memory that is separated from processors $p_1$ through $p_k$, then only a reduced number of memory accesses are necessary in order to form all combinations of the elements of vectors R and L. The temporal offset also makes it possible to achieve a complete capacity utilization of all processors during the entire processing time.

In the example shown here, initially values $l_i$ through $l_k$ of second vector L are loaded into processors $p_k$ through $p_i$. Then, in a first memory access, second element $r_2$ of first vector R is loaded into first processor $p_i$. Subsequently, first processor $p_1$ processes the combination of $l_k$ and $r_2$. The result of this processing is discarded since it does not lie in the lower triangular matrix. Subsequently, first processor $p_i$ transmits the previously received value of first vector R to the next processor $p_2$. At the same time, in a second memory access, the next element of first vector R is loaded into first processor $p_i$. First processor $p_i$ is then able to process the combination of $l_k$ and $r_3$, while the second processor $p_2$ processes the combination of $l_{k-1}$ and $r_2$. The result of this processing is discarded as well since it also does not lie in the lower triangular matrix. Subsequently, in a third memory access, the next element of the first vector R can be loaded into first processor $p_i$ and previously used elements of first vector R of processors $p_i$ and $p_2$ can be shifted onward by respectively one processor. The results of the subsequent processing are indicated by 1 and lie within the lower triangular matrix. All of the steps that now follow contribute toward calculating the result.

In FIG. 1, an oval 110 comprises the elements of first vector R that are successively loaded or shifted into processors $p_1$ through $p_k$ and are processed simultaneously. The described procedure can end when successively all elements of first vector R have been loaded into first processor $p_1$. Subsequently, a new element of second vector L is to respectively be loaded into processors $p_1$ through $p_k$. This step can be omitted if vectors R and L are identical since the values are already available from the previous run-through.

The present invention provides for changing the previously run through direction (ascending index j) and to run through in the opposite direction (descending index j). Furthermore, the assignment of processors to elements of second vector L is reversed: while previously an ascending index i of second vector L corresponded to a descending index of a processor $p_k$ through $p_1$, it now corresponds to an ascending index of processor $p_1$ through $p_k$ or vice versa. This makes it possible to balance the deviating row length for each individual processor $p_1$ through $p_k$. If processor $p_k$ in the ascending run-through had to process the greatest number of elements, in the descending run-through it now has to process the lowest number of elements.

An assignment of processors $p_1$ through $p_k$ to elements of second vector L for additional three rows of matrix 105 is indicated in FIG. 1. Next to the assignments, block arrows indicate in which direction index j of first vector R is incremented during a run through matrix 105 in the row direction. In the representation of FIG. 1, the run-through in the row direction toward the left ends with the elements directly to the right of the darkened diagonal elements of matrix 105. Subsequently, processors $p_1$ through $p_k$ are loaded anew with elements of second vector L and a new run-through through additional rows of matrix 105 occurs in the opposite direction, as was described above.

Figure 2:
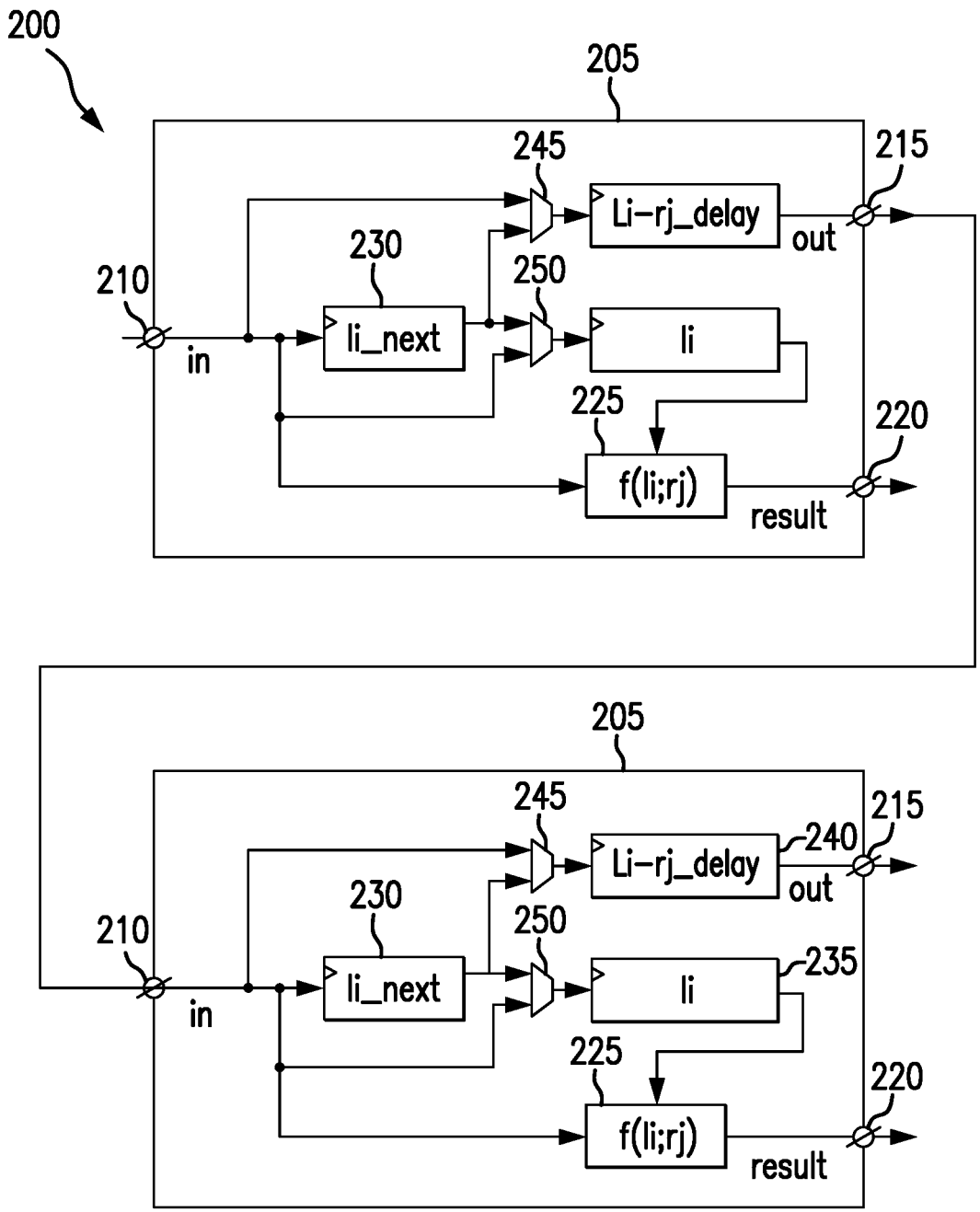
FIG. 2 illustrates a processor system for implementing the method of FIG. 1, according to an example embodiment of the present invention.

FIG. 2 shows a processor system 200, which is designed in particular for implementing the method 100 from FIG. 1. While FIG. 1 assumed, by way of example, three processors $p_1$ through $p_n$, only two processors 205 ($p_1$ and $p_2$, respectively) are shown in FIG. 2. A processor 205 comprises an input interface 210 for receiving an element of vectors R or L, an output interface 215 for connecting to an input interface 210 of a subsequent processor 205, an optional result interface 220 for providing a result of a processing on the basis of elements of first vector R and of second vector L, a processing device 225 for performing this processing, and preferably a first memory element 230, a second memory element 235, and/or a third memory element 240. In the specific embodiment shown, a first multiplexer 245 and a second multiplexer 250 are additionally provided.

Processor 205 is designed to receive an element $l_1$ of second vector L via input interface 210 and to store it in first memory element 230. At the same time, it is possible to provide a previously used element of the two vectors R and L from the third memory element 240 via output interface 215 to a subsequent processor 205. Concatenated processors 205 are thus able simultaneously to transmit respectively one element of first vector R to the subsequent processor 205. A more time-intensive staggered transmission ("ripple carry") is not required.

After a row of matrix 105 has been run through, the next required element $l_i$ is preferably copied from first memory element 230 or directly from interface 210 into second memory element 235 in order to protect it against overwriting. Processing device 225 is able to access second memory element 235 and input interface 210 directly.

What is claimed is:

1. A method for parallelized processing of elements of a first vector R using processors 1 through k, the method comprising:
   a) loading a first non-loaded element of the first vector R into processor 1;
   b) loading a next non-loaded element of the first vector R into processor 1;
   c) subsequent to performing step b), parallel processing, by the processors, those of the elements of the first vector R that have been loaded into the processors;
   d) subsequent to performing step c), transmitting those of the elements of the first vector R that are loaded in processors 1 through k−1 from the processors 1 through k−1 to the respectively next one of processors 2 through k; and
   e) subsequent to performing step d), as long as not all of the elements of the first vector R have yet been previously loaded into processor 1, returning to step b) for re-performance of steps b)-e), wherein the processors 1 through k operate in a temporally offset manner on the elements of the first vector R.

2. The method of claim 1, wherein the parallel processing comprises a maximum likelihood analysis of elements of the first vector R and the second vector L vectors.

3. A method for parallelized processing of elements of a first vector R and a second vector L using processors 1 through k, the method comprising the following steps:
   aa) loading a first non-loaded k elements of the second vector L into processors 1 through k;
   bb) loading a first non-loaded element of the first vector R into processor 1;
   a) loading a next non-loaded k elements of the second vector L into processors 1 through k;
   b) loading a next non-loaded element of the first vector R into processor 1;

c) subsequent to performing step b), parallel processing, by the processors, those of the elements of the first vector R that have been loaded into the processors;
d) subsequent to performing step c), transmitting those of the elements of the first vector R that are loaded in processors 1 through k−1 from the processors 1 through k−1 to the respectively next one of processors 2 through k;
e) subsequent to performing step d), as long as not all of the elements of the first vector R have yet been previously loaded into processor 1, returning to step b) for re-performance of steps b)-e), and otherwise proceeding to step f); and
f) subsequent to performing step e), as long as not all of the elements of the second vector L have yet been previously loaded into any of the processors 1 through k, returning to step a), wherein the processors 1 through k operate in a temporally offset manner on the elements of the first vector R.

4. The method of claim 3, wherein:
the parallel processing is limited to elements whose indices in the first vector R and the second vector L differ from one another;
the steps a) through f) are run through in order of ascending indices of elements of the first vector R;
a processor of processors 1 through k having a low index is assigned an element of the second vector L having a high index; and
a processor of processors 1 through k having a high index is assigned an element of the second vector L having a low index.

5. The method of claim 3, wherein the first vector R and the second vector L span a matrix whose elements are filled with results of the parallel processing in step c).

6. The method of claim 3, wherein the first vector R and the second vector L are identical.

7. A non-transitory computer-readable medium on which are stored instructions (a) that are executable by a multi-processor that includes processors 1 through k and (b) that, when executed by the multi-processor, cause the multi-processor to perform a method for parallelized processing of elements of a first vector R, the method comprising:
a) loading a first non-loaded element of the first vector R into processor 1;
b) loading a next non-loaded element of the first vector R into processor 1;
c) subsequent to performing step b), parallel processing, by the processors, those of the elements of the first vector R that have been loaded into the processors;
d) subsequent to performing step c), transmitting those of the elements of the first vector R that are loaded in processors 1 through k−1 from the processors 1 through k−1 to the respectively next one of processors 2 through k; and
e) subsequent to performing step d), as long as not all of the elements of the first vector R have yet been previously loaded into processor 1, returning to step b) for re-performance of steps b)-e), wherein the processors 1 through k operate in a temporally offset manner on the elements of the first vector R.

8. A processor comprising:
a processing device for processing one or multiple elements of a vector;
a first interface for receiving an element of the vector;
a first memory element configured for being loaded with the received element of the vector;
a second memory element for receiving the element of the first memory element, while the first memory element is loaded anew;
a third memory element for providing an element of the vector of another processing device;
a second interface for providing an element to another processor; and
a third interface for providing a result;
wherein the processor is adapted for being one of processors 1 through k for taking part in parallelized processing of the one or multiple elements of the vector along with others of processors 1 through k, the parallelized processing including:
a) loading a first non-loaded element of the vector into processor 1;
b) loading a next non-loaded element of the vector into processor 1;
c) subsequent to performing step b), parallel processing, by the processors, those of the one or multiple elements of the vector that have been loaded into the processors;
d) subsequent to performing step c), transmitting those of the one or multiple elements of the vector that are loaded in processors 1 through k−1 from the processors 1 through k−1 to the respectively next one of processors 2 through k; and
e) subsequent to performing step d), as long as not all of the one or multiple elements of the vector have yet been previously loaded into processor 1, returning to step b) for re-performance of steps b)-e), wherein the processors 1 through k operate in a temporally offset manner on the one or multiple elements of the vector.

9. A processor system comprising processors 1 through k concatenated in a series, wherein:
the processor system is configured to perform a method for parallelized processing of elements of a vector; the method comprises:
a) loading a first non-loaded element of the vector into processor 1;
b) loading a next non-loaded element of the vector into processor 1;
c) subsequent to performing step b), parallel processing, by the processors, those of the elements of the vector that have been loaded into the processors;
d) subsequent to performing step c), transmitting those of the elements of the vector that are loaded in processors 1 through k−1 from the processors 1 through k−1 to the respectively next one of processors 2 through k; and
e) subsequent to performing step d), as long as not all of the elements of the vector have yet been previously loaded into processor 1, returning to step b) for re-performance of steps b)-e), wherein the processors 1 through k operate in a temporally offset manner on the elements of the vector; and
each of the plurality of processors 1 through k includes:
a processing device for processing one or multiple elements of the vector;
a first interface for receiving an element of the vector;
a first memory element configured for being loaded with the received element of the vector;
a second memory element for receiving the element of the first memory element, while the first memory element is loaded anew;
a third memory element for providing an element of the vector of another processing device;
a second interface for providing an element to another processor; and
a third interface for providing a result.

* * * * *